United States Patent [19]

Kasperkovitz

[11] 3,761,900

[45] Sept. 25, 1973

[54] CAPACITIVE MATRIX STORE

[75] Inventor: Wolfdietrich Georg Kasperkovitz, Emmasingel, Eindhoven, Netherlands

[73] Assignee: U.S. Philips Corporation, New York, N.Y.

[22] Filed: Nov. 22, 1971

[21] Appl. No.: 200,791

[30] Foreign Application Priority Data

Nov. 27, 1970 Netherlands ...................... 7017342

[52] U.S. Cl. .................... 340/173 CA, 317/234 UA

[51] Int. Cl. ....................... G11c 11/24, G11c 11/40

[58] Field of Search ............................ 317/234 UA; 340/173 R, 173 CA; 307/238

[56] References Cited

UNITED STATES PATENTS

| | | | |
|---|---|---|---|
| 3,448,344 | 6/1969 | Schuster et al. | 317/101 |
| 3,532,945 | 10/1970 | Weckler | 317/234 U |
| 3,387,286 | 6/1968 | Dennard | 340/173 |
| 3,533,089 | 10/1970 | Wahlstrom | 340/173 |
| 3,665,423 | 3/1970 | Nakanuma et al. | 340/173 |
| 3,390,382 | 6/1968 | Igarashi | 340/173 R |

*Primary Examiner*—Stanley M. Urynowicz, Jr.
*Attorney*—Frank R. Trifari

[57] ABSTRACT

A capacitive matrix store comprising a two-dimensional array of crosspoint elements, each of which comprises a capacitive storage element, each crosspoint element, constructed as a two-pole comprising a transistor which is provided with an emitter region, a base region and a collector region, the emitter region of said transistor forming one pole and the collector region forming the other pole of the crosspoint element, the capacitive storage element in each crosspoint element being partly or entirely formed by the collector-base capacitance of the transistor.

5 Claims, 6 Drawing Figures

INVENTOR.
WOLFDIETRICH G. KASPERKOVITZ
BY
Frank R. Jeffreys
AGENT

Patented Sept. 25, 1973 3,761,900

3 Sheets-Sheet 2

*INVENTOR.*
WOLFDIETRICH G. KASPERKOVITZ
*BY*
AGENT

INVENTOR.
WOLFDIETRICH G. KASPERKOVITZ
BY
AGENT

CAPACITIVE MATRIX STORE

The invention relates to a capacitive matrix store comprising a two-dimensional array of crosspoint elements, which comprises a plurality of one-dimensional arrays of crosspoint elements, each of which crosspoint elements comprises a capacitive storage element and is provided with at least one pole for each coordinate direction, in which in each one-dimensional array of crosspoint elements of the same order in one of the coordinate directions, and of different order in the other coordinate direction, a multiple connection is present between each pole associated with the one coordinate direction of each crosspoint element and a corresponding pole of each other crosspoint element.

In a known capacitive matrix store each crosspoint element is formed by a capacitor and two diodes which are connected to the same side of the capacitor via opposed poles. The remaining side of the capacitor forms one pole of the crosspoint element, and the remaining poles of the diodes form two other poles of the crosspoint element, so that the crosspoint element has three poles. A matrix store of this kind is not suitable, or not readily suitable, for integration in a semiconductor body. Along each crosspoint element two conductors extend in one coordinate direction, and one conductor in the other coordinate direction. Such a system of mutually crossing conductors is difficult to provide on a semiconductor body. Furthermore, the integration of a capacitor and two diodes requires a comparatively large area of the semiconductor body. The number of crosspoint elements per unit of surface area is then comparatively small.

The invention has for its object, to provide a novel concept of the capacitive matrix store set forth, by which a large number of crosspoint elements per unit of surface area can be realized, and which is readily suitable for integration in a semiconductor body.

The matrix store according to the invention is characterized in that each crosspoint element, constructed as a two-pole, comprises a transistor which is provided with an emitter region, a base region and a collector region. The emitter region of said transistor forming one pole, and the collector region forming the other pole of the crosspoint element, the capacitive storage element in each crosspoint element being partly, or entirely formed, by the collector-base capacitance of the transistor.

In order that the invention may be readily carried into effect, one embodiment thereof will now be described in detail, by way of example, with reference to the accompanying diagrammatic drawings, in which.

Figure 1:
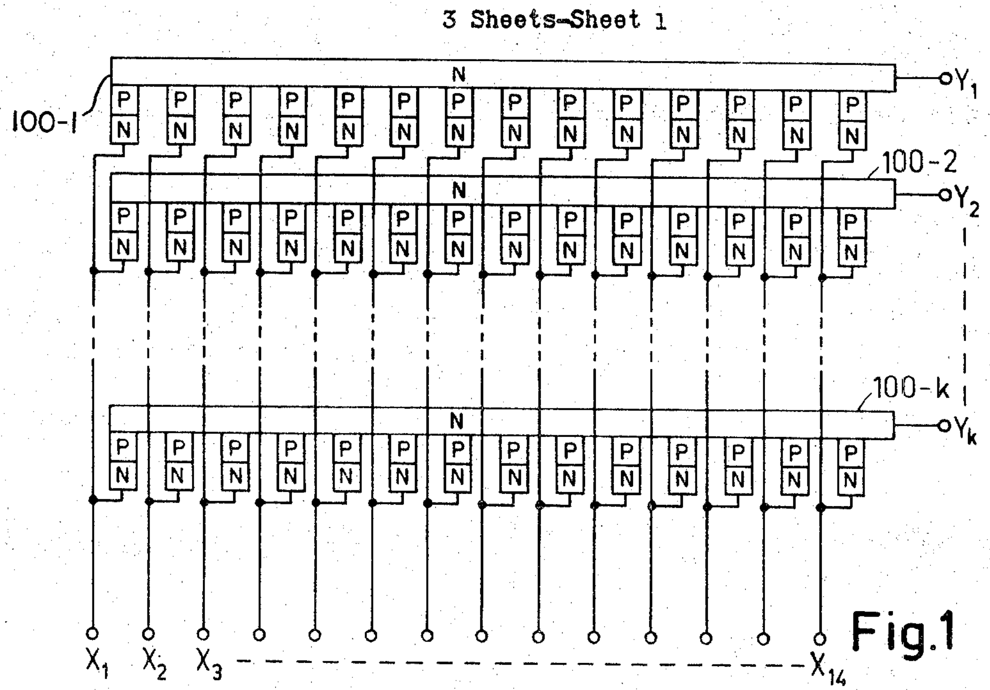
FIG. 1 is a diagrammatic view of a matrix store according to the invention.
Figure 3A:
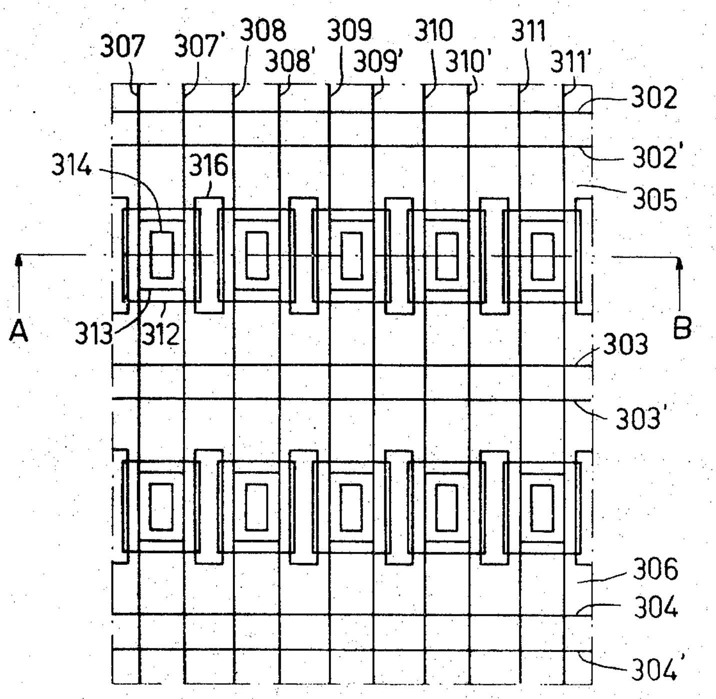
Figure 3B:
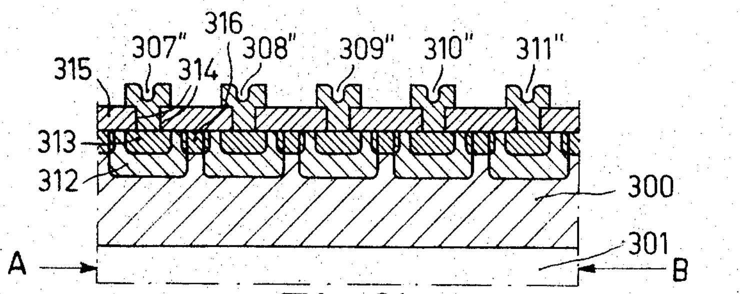
Figure 4:
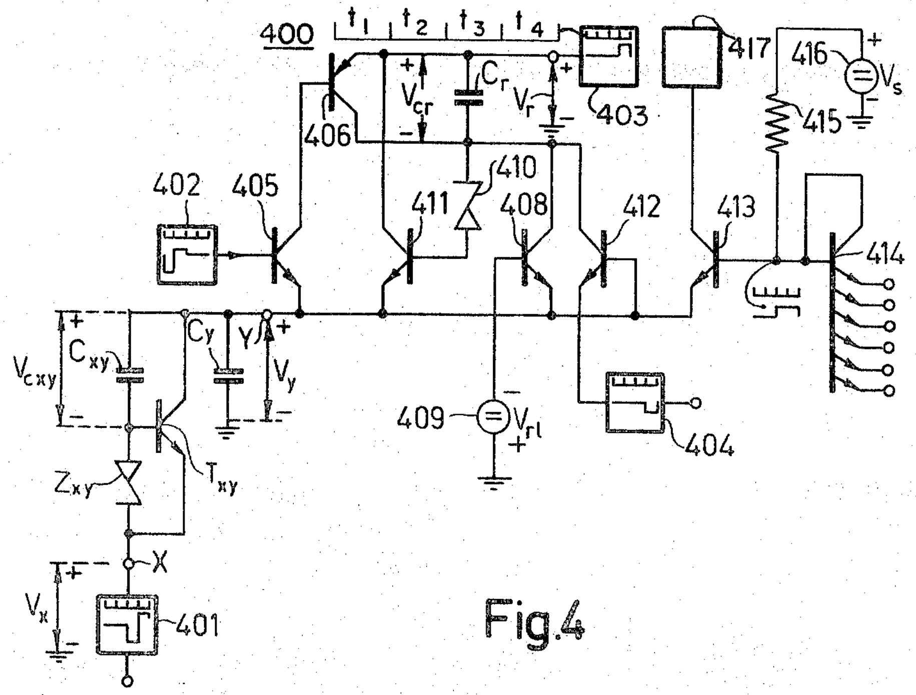
Figure 5:
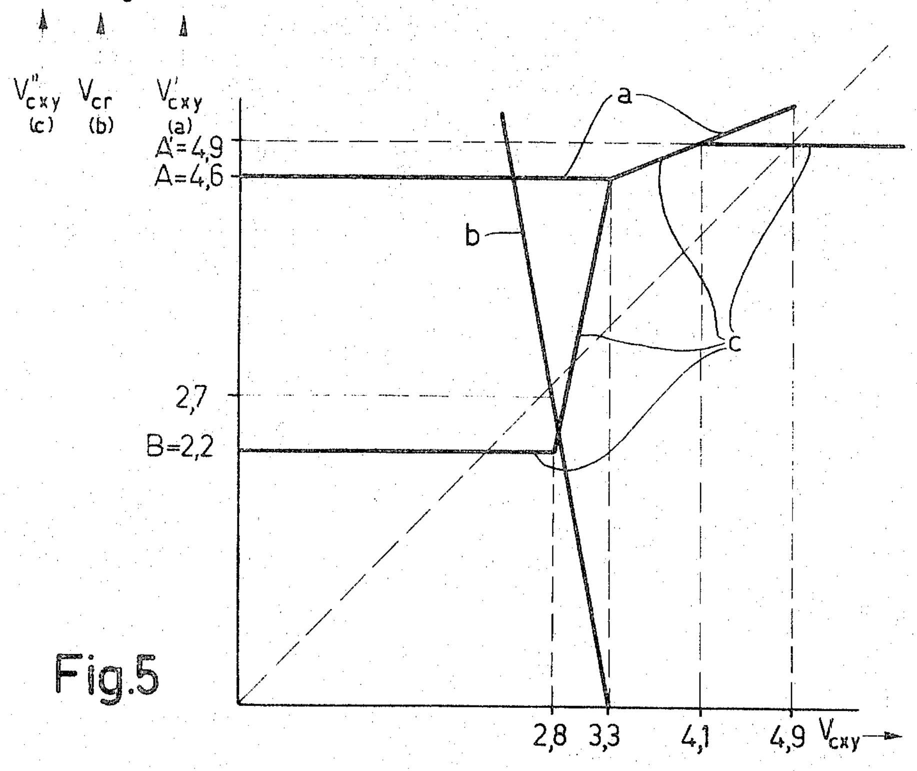

FIGS. 3*a* and 3*b* shows an example of an integrated construction of the store shown in FIG. 1, FIG. 4 shows a bit regeneration and selection circuit, and FIG. 5 shows some characteristics for illustrating the operation of the bit regeneration circuit shown in FIG. 4.

FIG. 1 is a diagrammatic representation of a matrix store according to the invention. The matrix store comprises $k$ strips of N-conducting semi-conductor material 100-1, 100-2, –, **100-*k***, only the first two strips and the last third being shown in the Figure. For example, $k = 32$. These strips terminate in the Y-drive conductors $Y_1, Y_2, -, Y_k$. Spaced along each strip are 14 regions of P-conducting semiconductor material, each of which forms a PN-junction with the strip. Each P-region is adjoined by a region of N-conducting semiconductor material which forms a PN-junction with the P-region. An N-region and a P-region which form a PN-junction and the portion of the strip of N-conducting material which forms a PN-junction with the P-region, will hereinafter be referred to as crosspoint element or "crosspoint" for short. Each crosspoint element is constructed in known manner such that, the described NPN-structure has the properties and operation of an NPN-transistor, the emitter of which is formed by the N-region, the base by the P-region, and the collector by the portion of the N-strip forming a PN-junction with the P-region.

The "crosspoints" of the matrix store shown in FIG. 1, are arranged according to a two-dimensional array or matrix with the two coordinate directions X and Y. Each "crosspoint" has one pole for each coordinate direction. The pole for the X-direction is formed by the N-region, i.e. the emitter of the NPN-transistor, and the pole for the Y-direction is formed by the portion of the N-strip which forms a PN-junction with the P-region, i.e. the collector of the NPN-transistor. The emitters of the "crosspoints" having the same order in the X-direction and a different order in the Y-direction are multiply connected via one of the X-drive conductors $X_1, X_2, X_3, -, X_{14}$. The collectors of the "crosspoints" of the same order in the Y-direction and of different order in the X-direction are multiply connected via one of the N-strips 100-1, 100-2, –, **100-*k***. The number of 14 crosspoints per N-strip has merely been chosen for the purpose of illustration. In practice 32 is a more common value. Using this value and $k = 32$, a matrix store comprising 1024 "crosspoints" is obtained.

Figure 2:
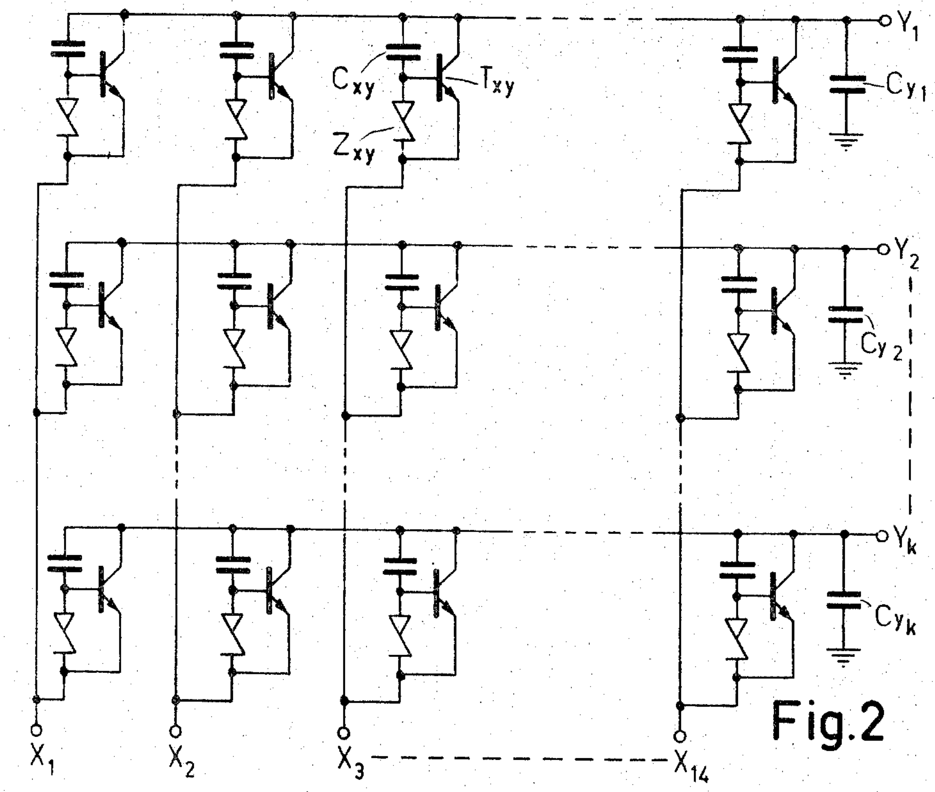
FIG. 2 shows the equivalent circuit diagram of the store shown in FIG. 1.

In FIG. 2, the equivalent circuit diagram of the matrix store shown in FIG. 1 is illustrated. For the sake of simplicity, only the crosspoints coupled to the X-drive conductors $X_1$, $X_2$, $X_3$ and $X_{14}$ are shown. As is shown in FIG. 2, each crosspoint consists of an NPN-transistor $T_{xy}$, a capacitor $C_{xy}$ which is connected between the collector and the base, and a Zener diode $Z_{xy}$ which is connected between the base and the emitter. The transistor $T_{xy}$ represents the normal transistor operation of the NPN-structure shown in FIG. 1. The capacitor $C_{xy}$ represents the collector-base capacitance of the NPN-structure shown in FIG. 1, and the Zener diode represents the operation of the PN-junction between the N-region and the P-region of the NPN-structure shown in FIG. 1 upon polarization in the reverse direction.

The capacitors $Cy_1, Cy_2, -, Cy_k$, connecting the Y-drive conductors $Y_1, Y_2, -, Y_k$ to earth, represent the parasitic capacitances of the strips of N-conducting material, i.e. the capacitances with respect to the substrate in the integrated form. Typical values for the capacitances $C_{xy}$ and $C_y$ are:

$C_{xy} = 0.08$ pF $C_y = 8$ pF

A lay-out for an integrated construction of the matrix store shown in FIG. 1, is illustrated in FIG. 3*a*. FIG. 3*b* is a sectional view. FIG. 3*a* relates to a portion of the total surface of the integrated circuit, comprising two rows having five "crosspoints" each. The rectangles indicate the location of the contact windows and the semiconductor regions which together form a crosspoint. The integrated circuit is provided in an N-epitaxial layer 300 which is provided on a P-substrate 301. The epitaxial layer 300 is divided into strips by isolation diffusions. In FIG. 3*a* each of the line pairs 302–302′, 303–303′ and 304–304′ bounds an isolation diffusion. The strips 305 and 306 are situated between these isolation diffusions. Each of the line pairs 307–307′, 308–308′, 309–309′, 310–310′ and 311–311′ bounds a vapor deposited aluminium strip 307″, 308″, 309″, 310″ and 311″ which acts as an X-drive conductor.

In each "crosspoint", a P-region 312 is diffused in the N-epitaxial layer 300, and in this P-region an N-region 313 is diffused. The N-region 313 is connected to the X-drive conductor via the contact window 314 in the oxide layer 315. Between each two successive P-regions in the same N-strip, an N-region 316 is diffused which partly overlaps the P-regions. This region increases the collector-base capacitances of the "crosspoints" situated on either side thereof. Consequently, a more effective storage action of the crosspoints is realized and the effect of the parasitic emitter-base capacitance is reduced. Another method of increasing the collector-base capacitance is to increase the base region.

The following illustrative data can further be given for an integrated construction of the matrix store for practical use:

- Scale of FIG. 3*a*, 1 mm on paper is approximately 1$\mu$m of the integrated circuit.
- Scale of FIG. 3*b*, vertically: 4 mm on paper is approximately 1$\mu$m of the integrated circuit; horizontally: same as in FIG. 3*a*.
- N-regions 313 and 316, emitter diffusions, resistance per square: 2 ohms.
- P-region 312, base diffusion, resistance per square: 150 ohms.
- N-epitaxial layer 300, specific resistance : 0.01 ohm/cm.
- P-substrate 301, specific resistance : 3 ohm/cm.
- Capacitance between 312 and 300: approximately 0.04 pF.
- Capacitance between 312 and 316: approximately 0.04 pF.
- Total effective collector-base capacitance $C_{xy}$: approximately 0.08 pF.
- Crosspoint density: 1050 crosspoints/mm$^2$.

An example of a possible operation of the matrix store will be given with reference to the FIG. 2, using the following illustrative data:

- Breakdown voltage of Zener diode $Z_{xy}$: 5.5 volts.
- Base-emitter knee voltage of transistor $T_{xy}$: 0.6 volt.
- Voltage of selected drive conductor: +2 volts or −2 volts.
- Voltage of non-selected drive conductors : 0 volt.

The capacitor $C_{xy}$ of an arbitrary crosspoint can be charged to a given voltage, the so-termed reference voltage, by increasing the potential of the Y-drive conductor to +2 volts and simultaneously decreasing the potential of the X-drive conductor to −2 volts. Capacitor $C_{xy}$ is then positively charged by the base current of transistor $T_{xy}$ to the voltage which is equal to the potential difference between the Y and the X-drive conductor, reduced by the base-emitter knee voltage of transistor $T_{xy}$, i.e. a voltage of $4 - 0.6 = 3.4$ volts. The reference value of 3.4 volts is assumed to correspond to a stored binary 0. If a binary 1 is to be stored, the potential of the Y-drive conductor is decreased to −2 volts, after the voltage of capacitor $C_{xy}$ has been brought to the reference value, and the potential of the X-drive conductor is simultaneously increased to +2 volts. The Zener diode $Z_{xy}$ will then break down and capacitor $C_{xy}$ is discharged, via the Zener diode, to the voltage which is equal to the difference between the breakdown voltage and the potential difference between the X and the Y-drive conductor, i.e. a voltage of $5.5 - 4 = 1.5$ volts. The value of 1.5 volts corresponds to a stored binary 1. For reading the stored information, the capacitor $C_{xy}$ is charged to the reference value, and the charging current flowing through the Y or the X-drive conductor is detected. If a binary 0 is stored, no current or only a small charging current flows. However, if a binary 1 is stored, a comparatively strong charging current flows. The stored information can be determined by discrimination of the charging current.

It can be readily verified that the "crosspoints" which are coupled to only one of the selected drive conductors, i.e. "half-selected crosspoints", are not influenced during the selection of a "crosspoint". For the "half-selected crosspoints" two extreme voltage situations occur. One extreme situation occurs when capacitor $C_{xy}$ has a voltage of 1.5 volts and the Y-drive conductor is selected by +2 volts or the X-drive conductor is selected by −2 volts. The base-emitter voltage of transistor $T_{xy}$ then amounts to +0.5 volt. This value lies just below the knee voltage of 0.6 volt, so that the charge cannot be changed via the transistor $T_{xy}$. The other extreme situation occurs when capacitor $C_{xy}$ has a voltage of 3.4 volts and the X-drive conductor is selected by +2 volts, or the Y-drive conductor is selected by −2 volts. The voltage across the Zener diode then amounts to −5.4 volts. This value lies just below the breakdown voltage of 5.5 volts, so that the charge cannot be changed via the Zener diode.

The charge of the capacitors $C_{xy}$ will be decreased by leakage currents. In order to maintain the information stored in the matrix store, the charge of each capacitor $C_{xy}$ is to be regularly regenerated. This can be effected by reading the stored information regularly one bit after the other, and by writing it back in an unchanged form. This method, which is suitable for matrix stores comprising a number of crosspoints which are not too large, gives rise to problems in the case of larger stores. In the case of large stores, the maximum interval between two regenerations, which is permissible in view of reliable regeneration, may easily be smaller than the shortest interval which can be realized when using bit-wise regeneration. Consequently, for large stores, preference is given to word-wise regeneration, a word consisting of a plurality of bits being read in one step and being written back in one step according to this method. Hereinafter, a word is to be understood as the group of bits which are stored in the "crosspoints" of the matrix store which are coupled to a same X-drive conductor (a "column").

When a word-wise regeneration is used, the "crosspoints" are selected column-wise. For reading a word, the voltage of the X-drive conductor is brought to $V_{x\,min}$ volts, and the voltage of all Y-drive conductors is kept at $V_{y\,min}$ volts. The capacitors $C_{xy}$ of the selected "column" are then charged to the voltage:

$$A = (V_{y\ min} - V_{x\ min} - 0.6) \text{ volts}$$

via the base-emitter junctions of the transistors $T_{xy}$. Subsequently, the voltage of the X-drive conductor is brought to $V_{x\ max}$ volts; $V_{x\ max} > V_{x\ min}$. The voltage of the Y-drive conductors at which a binary 1 is detected is kept at $V_{y\ min}$ volts, and the voltage of the Y-drive conductors at which a binary 0 is detected is brought to $V_{y\ max}$ volts; $V_{y\ max} > V_{y\ min}$. The capacitors $C_{xy}$ of the crosspoints in which a binary 1 was stored are then discharged via the Zener $Z_{xy}$ to the voltage:

$B = (V_{y\ min} - (V_{x\ max} - 5.5)$ volts. The capacitors $C_{xy}$ of the crosspoints in which a binary 0 was stored retain the voltage A, if the following inequality is satisfied:

$$V_{x\ max} - (V_{y\ max} - A) > +5.5. \qquad 1$$

This inequality denotes that the breakdown voltage of the Zener diode is not to be exceeded when a binary 0 is written back.

The voltage of the non-selected X-drive conductors is assumed to amount to 0 volt. In order to prevent influencing of the non-selected "columns" during the regeneration of the word of a selected "column", the following inequalities are to be satisfied.:

$$V_{y\ min} - A > 31\ 5.5 \qquad 2$$

$$V_{y\ max} - B > +0.6 \qquad 3$$

The left-hand member of inequality 2 is given the minimum value of the base voltage of the transistors $T_{xy}$. This value occurs in the crosspoints in which a binary 0 is stored. In the non-selected "columns", this value is to be higher than −5.5 volts in order to prevent breakdown of the Zener diode. In the left-hand member of inequality 3 the maximum value of the base voltage of the transistors $T_{xy}$ is given. This value occurs in the "crosspoints" in which a binary 1 is stored. In the non-selected "columns", this value must be smaller than +0.6 volt in order to prevent transistor $T_{xy}$ from becoming conducting.

By substitution of the values of A and B in the unequalities 1, 2 and 3, the following inequalities are obtained:

$$(V_{x\ max} - V_{x\ min}) - (V_{y\ max} - V_{y\ min}) > +6.1 \qquad (4)$$

$$V_{x\ min}\ 22 - 6.1 \qquad 5$$

$$V_{x\ min} + (V_{y\ max} - V_{y\ min}) < +6.1 \qquad 6$$

In general, attempts will be made to choose as large a difference as possible between the voltage A, characterizing a stored 0, and the voltage B, characterizing a stored 1. This is the case if $V_{x\ max} - V_{x\ min}$ is as large as possible. When $V_{x\ max} - V_{x\ min} = +9$ volts, and $V_{x\ min} = -6$ volts, the inequalities 4 and 6 can just be satisfied by $V_{y\ max} - V_{y\ min}$. Using the said values of $V_{x\ max} - V_{x\ min}$ and $V_{x\ min}$, the inequalities 4 and 6 are reduced to:

$$V_{y\ max} - V_{y\ min} > 2.9 \qquad 7$$

$$V_{y\ max} - V_{y\ min} < 3.1 \qquad (8)$$

When $V_{y\ max} - V_{y\ min} = 3$ volts, both inequalities 7 and 8 are just satisfied.

From the foregoing, it also follows that $V_{x\ max} = +3$ volts. $V_{y\ min}$ may be selected, for example, as $V_{y\ min} = -1$ volt. From this it follows that $V_{y\ max} = +2$ volts. Using these values: A = +4.4 volts and B = 1.5 volts.

It is to be noted that the above-mentioned values for $V_{x\ max} - V_{x\ min}$ and $V_{x\ max}$ are critical values, at which just no influencing of non-selected "columns" occurs during the regeneration of a word. In practice, preference may be given to less critical values.

A bit regeneration circuit which is connected to a Y-drive conductor will now be described with reference to the FIGS. 4, 5, and 6. The following illustrative values are applicable:

$V_{x\ max} = 2.5$ volts
$V_{x\ min} = -6$ volts
$V_{y\ max} = +1.9$ volts
$V_{y\ min} = -0.8$ volt
A = +4.6 volts
B = +2.2 volts In FIG. 4, one "crosspoint" of the matrix store is illustrated. The bit regeneration circuit 400 is connected to the Y-drive conductor thereof. Pulse source 401 is connected to the X-drive conductor of the "crosspoint". The bit regeneration circuit 400 has connected thereto the pulse sources 402, 403 and 404. (Pulse source 404 is to be neglected for the time being). The regeneration of a bit is effected in four consecutive time phases, which are denoted in succession by $t_1$, $t_2$, $t_3$ and $t_4$. The pulse sources 402 and 403 are premanently in operation, while pulse source 401 becomes active only if the illustrated "crosspoint" is to be selected. The pulse sources 402 and 403, and the pulse source 401, when active, supply the voltages given in the table below in the four phases $t_1$, –, $t_4$.

| | $t_1$ volts | $t_2$ volts | $t_3$ volts | $t_4$ volts |
|---|---|---|---|---|
| 401 ($V_x$) | 0 | 0 | −6 | +2.5 |
| 402 | −6 | +0.6 | −0.6 | −0.6 |
| 403 ($V_r$) | +4 | +4 | +4 | +8 |

In phase $t_1$ of the regeneration cycle, the breakdown-voltage of the emitter-base junction of the transistor 405 is superseded by the −6 volts output voltage of pulse source 402. The breakdown voltage is assumed to be 5.5 volts. By means of this emitter-base breakdown, the parasitic capacitance $C_y$ of the Y-drive conductor is discharged to a voltage of −0.5 volt. In the phase $t_2$, the transistor 405 is driven into conduction by the +0.6 volt output voltage of pulse source 402. The collector current of transistor 405 drives the transistor 406 into conduction, with the result that the regeneration capacitor $C_r$, connected in parallel with the emitter-collector current path of the latter transistor, is discharged to 0 volt. The emitter current of transistor 405 charges the parasitic capacitance $C_y$. The base-emitter knee voltage of transistor 405 is assumed to amount to 0.6 volt. The voltage $V_y$ of the Y-drive conductor will amount to 0 volt at the end of phase $t_2$, while the voltage $V_{cr}$ of the regeneration capacitor $C_r$ then also amounts to 0 volt.

In the phase $t_3$, the information 0 or 1 stored in capacitor $C_{xy}$ of the selected crosspoint, is transferred to the regeneration capacitor $C_r$. Pulse source 401 decreases the voltage $V_x$ of the X-drive conductor to $V_{x\,min} = -6$ volts. The regeneration circuit 400 comprises a transistor 408, whose emitter is connected to the Y-drive conductor, and whose base is connected to a negative voltage source 409 having a voltage: $F_{r1} = 0.2$ volt. Due to the decrease of $V_x$, the voltage $V_y$ of the Y-drive conductor will decrease, however, not further than $V_{y\,min} = -0.8$ volt, assuming that the base-emitter knee voltage of transistor 408 is 0.6 volt. In this phase, a charging current can flow from the output of pulse source 403, having an output voltage $V_r$ of +4 volts, via the regeneration capacitor $C_r$ and transistor 408, to the selected "crosspoint". The parasitic capacitance $C_y$ is discharged, and the discharging current thereof also flows to the selected "crosspoint". In the selected "crosspoint", the capacitor $C_{xy}$ is charged by the base current of transistor $T_{xy}$. This base current is a fraction $1/\alpha'$ of the current flowing to that crosspoint, $\alpha'$ representing the current amplification factor of transistor $T_{xy}$.

At the end of phase $t_3$, the voltage $V_{cr}$ of regeneration capacitor $C_r$ will be a function of the voltage $V_{cxy}$ of capacitor $C_{xy}$ at the beginning of this phase.

When the charging process of the regeneration capacitor $C_r$ and of the "crosspoint" is considered in more detail, it is found that for values of $V_{cxy}$ which exceed a given value, the charging current of the "crosspoint" is entirely supplied by capacitor $C_y$. The voltage of the Y-drive conductor does not become sufficiently negative to bring transistor 408 into the conducting state. In order to bring transistor 408 into the conducting state, the voltage $V_y$ has to decrease at least to $V_{y\,min} = -\mathbf{0.8}$ volt, taking into account the fact that the base voltage is −0.2 volt, and the base-emitter knee voltage is 0.6 volt. Using the values:

$C_y = 8$ pF
$C_{xy} = 0.08$ pF
$\alpha' = 60$ it can be calculated that, if at the beginning of phase $t_3$, $V_{cxy} > 3.3$ volts, transistor 408 does not become conducting and the regeneration capacitor $C_r$ is not charged. The voltage $V_y$ does not decrease to $V_{y\,min} = -0.8$ volt, but has a more positive value.

If $V_{cxy} < 3.3$ volts at the beginning of phase $t_3$, transistor 408 will become conducting and the Y-drive conductor will assume the voltage $V_{y\,min} = 0.8$ volt. The capacitor $C_{xy}$ of the selected crosspoint is then charged to: A = 4.6 volts. If $V_{cxy} > 3.3$ volts at the beginning of phase $t_3$, the voltage at the end of phase $t_3$ is given by the relation.

$$V'_{cxy} = (6\ V_{cxy} + 54)\ /\ 16 \qquad (9).$$

in which $V_{cxy}$ represents the voltage at the beginning, and $V'_{cxy}$ represents the voltage at the end of the phase $t_3$. The relationship between $V'_{cxy}$ and $V_{cxy}$ is illustrated in FIG. 5 (characteristic *a*) for all values of $V_{cxy}$.

If $V_{cxy} < 3.3$ volts at the beginning of phase $t_3$, the regeneration capacitor $C_r$ is charged to a voltage which is given by the relation:

$$V_{cr} = 19.6 - 6\ V_{cxy}. \qquad 10$$

This relation is illustrated in FIG. 5 (characteristic *b*). As appears from relation 10, in this phase, a six-fold amplification of the voltage $V_{cxy}$ is realized.

In phase $t_4$, the information which is stored in the regeneration capacitor $C_r$, is written back into the capacitor $C_{xy}$ of the selected "crosspoint". The pulse source 401 increases the voltage $V_x$ to $V_{x\,max} = +2.5$ volts, and the pulse source 403 increases the voltage $V_r$ to +8 volts. The increased voltage $V_r$ acts, via the regeneration capacitor $C_r$ and the Zener diode 410, on the base of a transistor 411, the emitter of which is connected to the Y-drive conductor and the collector of which is connected to pulse source 403.

First, the case will be considered where the voltage $V_{cr}$ of the regeneration capacitor $C_r$ of the beginning of phase $t_4$ is equal to 0 volt. Due to the increase of the voltage $V_r$ to +8 volts, the breakdown voltage of the Zener diode 410 us superseded and transistor 411 becomes conducting. Taking into account a breakdown voltage of 5.5 volts and a base-emitter knee voltage of 0.6 volt, the voltage $V_y$ is then increased to $V_{y\,max} = +1.9$ volts. The maximum value of the voltage $V'_{cxy}$ on capacitor $C_{xy}$ at which the breakdown voltage of the Zener diode $Z_{xy}$ is just equalled, is A' = 4.9 volts. When $V'_{cxy} < 4.9$ volts, the capacitor $C_{xy}$ retains this voltage. When $V'_{cxy} > 4.9$ volts, the capacitor $C_{xy}$ is discharged to A' = 4.9 volts via the Zener diode $Z_{xy}$.

Using the characteristics *a* and *b* shown in FIG. 5, the foregoing can be readily related to the voltage $V_{cxy}$ at the beginning of phase $t_3$. The voltage of capacitor $C_{xy}$ at the end of phase $t_4$ is denoted by $V''_{cxy}$. The relationship between $V''_{cxy}$ and $V_{cxy}$ is illustrated in FIG. 5 (characteristic *c*). The foregoing relates to the case where the voltage $V_{cr}$ is equal to 0 volt. According to characteristic *b* this case occurs for $V_{cxy} > 3.3$ volts. According to characteristic a, $V'_{cxy} < \mathbf{4.9}$ volts for $\mathbf{3.3} < V_{cxy} < 4.1$ volts, so that characteristic *c* coincides with characteristic *a* for this range of values of $V_{cxy}$. According to characteristic a, $V'_{cxy} > 4.9$ volts for $V_{cxy} > 4.1$ volts, so that as of this value, characteristic *c* extends in parallel with the horizontal axis at a level of A' = 4.9 volts.

Hereinafter, the case will be considered where $V_{cr} > 2.7$ volts, at the beginning of phase $t_4$. The voltage of the Y-drive conductor at the end of phase $t_3$ is then $V_{y\,min} = -0.8$ volts. If $V_{cr} > 2.7$ volts, the increased voltage $V_r$ in phase $t_4$ is just not capable of superseding the breakdown voltage of the Zener diode 410, and $V_y$ remains equal to $V_{y\,min} = -0.8$ volts, during the phase $t_4$. Due to the increase of $V_x$ to $V_{x\,max} = +2.5$ volts in this phase, the capacitor $C_{xy}$ of the selected "crosspoint" is discharged via the Zener diode $Z_{xy}$ to $V''_{cxy} = 2.2$ volts. The discharge current flows into the capacitor $C_y$. The voltage of capcitor $C_y$ is varied only little, as its capacitance is 100 times larger than that of capacitor $C_{xy}$, and no current amplification by transistor $T_{xy}$ occurs in this case. The foregoing can be readily related to the voltage $V_{cxy}$ at the beginning of phase $t_3$, by using characteristic *b*. According to characteristic *b*, $V_{cr} >$ 2.7 volts for $V_{cxy} < 2.8$ volts so that for, $V_{cxy} < 2.8$ volts, characteristic c extends parallel to the horizontal axis at a level of 2.2 volts.

The two described cases are border cases. Between these border cases, i.e. for $2.8 > V_{cxy} > 3.3$ volts, the voltage $V_y$ in phase $t_4$ has a value between $V_{y\ min} = -0.8$ volt and $V_{y\ max} = +1.9$ volts, and capacitor $C_{xy}$ is discharged to a voltage between B = 2.2 volts and A = 4.6 volts. The linear relationship illustrated by characteristic c in the range $2.8 > V_{cxy} > 3.3$ volts, then exists between $V''_{cxy}$ and $V_{cxy}$.

The characteristic c intersects the straight line which is defined by: $V''_{cxy} = V_{cxy}$, shown in a broken line in FIG. 5, at a point where $V_{cxy} \approx 3$ volts. This value of 3 volts is the discrimination value of regeneration circuit 400. Voltages higher than 3 volts are regenerated to A' = 4.9 volts after one or more regeneration cycles, and voltages lower than 3 volts are regenerated to B = 2.2 volts after one or more regeneration cycles.

When the regeneration circuit 400 is used, a stored binary 0 is characterized by the value A' = 4.9 volts instead of by the value A = 4.6 volts. This is due to the fact that if $V_{cxy} > 3.3$ volts at the beginning of phase $t_3$, the charging current for capacitor $C_{xy}$ is entirely supplied by the capacitor $C_y$ so that $V_y$ cannot decrease to $V_{y\ min} = -0.8$ volt, and capacitor $C_{xy}$ is charged to a value higher than 4.6 volts in phase $t_3$. As may be derived from characteristic c, FIG. 5, the value A' = 4.9 volts is reached for $3.3 < V_{cxy} < 4.1$ volts after two complete regeneration cycles.

For reading and writing information in a "crosspoint", the regeneration circuit 400 also comprises additional circuit elements. These are the transistors 412, 413 and 414. The pulse source 404, connected to the emitter of transistor 412, is capable of supplying a write current in phase $t_4$. A read-write cycle consists, like a regeneration cycle, of four phases $t_1$, $t_2$, $t_3$ and $t_4$. The operation of the regeneration circuit 400 in the phases $t_1$ and $t_2$ of a read-write cycle is identical to the operation in the phases $t_1$ and $t_2$ of a regeneration cycle. The selection of the X-drive conductor of the "crosspoint" in the phases $t_3$ and $t_4$ of a read-write cycle is effected in the same way as in the phases $t_3$ and $t_4$ of a regeneration cycle.

The transistors 413 and 414 serve for the Y-selection of the crosspoint. The base of transistor 413 is connected to a voltage source 416 having a voltage $V_s = +0.2$ volt via a resistor 415.

During regeneration, at least one of the emitters of multi-emitter transistor 414 is connected to a negative voltage such that the base of transistor 413 has a voltage which is lower than −0.2 volt. The emitter of transistor 413 is connected to the Y-drive conductor. Having a base voltage lower than −0.2 volt and a base-emitter knee voltage of 0.6 volt, transistor 413 is not conducting for $V_y \geq V_{y\ min} = -0.8$ volt. The Y-drive conductor is selected in the phases $t_3$ and $t_4$, by increasing the voltage of all emitters of transistors 414 such that transistor 414 no longer sustains a current. The base of transistor 413 then receives the voltage Vs = +0.2 volt.

In phase $t_3$, $V_x$ is reduced to $V_{x\ min} = -6$ volts. The voltage $V_y$ cannot further decrease than the base voltage of transistor 413 minus the base-emitter knee voltage, i.e. $V'_{y\ min} = V_s - 0.6$ volt = −0.4 volt. The value of $V'_{y\ min}$ is 0.4 volt higher than the value of $V_{y\ min}$ during phase $t_3$ of the regeneration cycle ($V'_{y\ min} = V_{y\ min} + 0.4$ volt). Consequently, transistor 408 is not conducting. If a binary 1 is stored in the crosspoint, a charging current flows to the crosspoint via transistor 413, so that the capacitor $C_{xy}$ of the crosspoint is charged to $V_{cxy}$ = A + 0.4 volt = 5 volts. The charging current is detected by the detection circuit 417, which is connected to the collector of transistors 413, and which indicates the binary 1 read from the "crosspoint" on the output thereof. Transistor 408 is not conducting, so that the regeneration capacitor $C_r$ is not charged. A binary 0 is distinguished from a binary 1 by the absence of a charging current, or by a much smaller charging current. A condition in this respect is, of course, that the stored information is regenerated often enough to prevent degeneration of the information.

In phase $t_4$, information can be written in the selected "crosspoint". In phase $t_4$ of the read-write cycle, like in the phase $t_4$ of a regeneration cycle, the voltage $V_r$ of pulse source 403 is increased to + 8 volts. If nothing further happens, $V_y$ is increased to $V_{y\ max} = +1.9$ volts as $V_{cr} = 0$ volt. In this phase $V_x$ is increased to $V_{x\ max} = +2.5$ volts. The capacitor $C_{xy}$ is then discharged, via the Zener diode $Z_{xy}$, to A' = 4.9 volts. As a result, a binary 0 is written in the "crosspoint". If a binary 1 is to be written, the current source 404 is activated. Transistor 412 then carries a current in phase $t_4$ which charges the regeneration capacitor $C_r$ in an accelerated manner. As a result, the increase of $v_r$ remains ineffective, and $V_y$ has the same value $V'_{y\ min} = V_{y\ min} + 0.4$ volt as in phase $t_3$. Consequently, capacitor $C_{xy}$ is discharged, via Zener diode $Z_{xy}$, to the value B + 0.4 volt = 2.6 volts. After one regeneration cycle, capacitor $C_{xy}$ has the voltage $V_{cxy}$ = B = 2.2 volts, as appears from characteristic c, FIG. 5 which corresponds to a binary 1.

The value of voltages and capacitances given in the description are illustrative values. The values occurring in practice will deviate therefrom, for example, due to parasitic influences such as of the emitter-base capacitance of "crosspoints". The given illustrative values approximate the actual values sufficiently, however, for giving a representative picture of the operation of the matrix store under practical conditions.

What is claimed is:

1. A capacitive matrix store constructed as a plurality of one-dimensional arrays, each array comprising a plurality of transistor-like elements, said arrays arranged wherein said transistor-like elements are disposed in a plurality of columns and a plurality of rows, said rows situated transversely of said columns, said transistor-like elements each having an emitter region, a base region, and a collector region, the collector region of each respective transistor-like element being commonly connected across each respective row, and the emitter region of each respective transistor-like element being commonly connected across each respective column, said base region of each transistor-like element being connected to an electrical path disposed between a respective column and row of each transistor-like element, and each respective path having a capacitive storage portion formed at least in part by collector-base capacitance of the respective transistor-like element, said emitter region of each transistor-like element being connected to the base region of said respective transistor-like element to form an emitter-base diode-like path and means being provided for polarizing this emitter-base diode-like path.

2. The capacitive matrix store of claim 1, wherein said transistor-like elements in each array are integrated in a strip of semi-conductor material.

3. The capacitive matrix store of claim 2, wherein each trip is unitarily constructed in a semiconductor body with each strip being mutually insulated from each other.

4. The capacitive matrix store of claim 1, wherein in each transistor-like element a semiconductor region is provided which is formed by an emitter diffusion between the base region and said collector region.

5. The capacitive matrix store of claim 1, wherein between two successive transistor-like elements of each one-dimensional array, one semiconductor region, formed by an emitter diffusion, is provided between the base regions and the collector regions of the two transistor-like elements.

* * * * *